(12) United States Patent
Katz et al.

(10) Patent No.: US 9,552,566 B1
(45) Date of Patent: Jan. 24, 2017

(54) METHOD AND SYSTEM FOR SELLING PRODUCTS OVER A COMMUNICATIONS NETWORK

(75) Inventors: Benjamin Katz, Cambridge, MA (US); Cheryl Kaplan, Boston, MA (US)

(73) Assignee: Ruelala, Inc., Boston, MA (US)

(*) Notice: Subject to any disclaimer, the term of this patent is extended or adjusted under 35 U.S.C. 154(b) by 1070 days.

(21) Appl. No.: 12/981,064

(22) Filed: Dec. 29, 2010

(51) Int. Cl.
G06Q 30/00 (2012.01)
G06Q 10/08 (2012.01)
G06Q 20/12 (2012.01)
G06Q 10/00 (2012.01)

(52) U.S. Cl.
CPC ............ *G06Q 10/087* (2013.01); *G06Q 20/12* (2013.01); *G06Q 10/00* (2013.01)

(58) Field of Classification Search
CPC ..... G06Q 10/00; G06Q 10/0087; G06Q 20/12
USPC ............... 705/26.1, 26.2, 26.25, 26.3, 26.35, 26.4, 705/26.41–26.44, 26.5, 26.61–26.64, 26.7, 26.8, 705/26.81, 26.82, 26.9, 27.1, 27.2
See application file for complete search history.

(56) References Cited

U.S. PATENT DOCUMENTS

| | | | | |
|---|---|---|---|---|
| 4,593,936 A | * | 6/1986 | Opel | 283/112 |
| 5,918,213 A | * | 6/1999 | Bernard et al. | 705/26.35 |
| 5,960,411 A | * | 9/1999 | Hartman et al. | 705/26.81 |
| 7,660,749 B2 | * | 2/2010 | Koski | 705/26.8 |
| 2002/0143690 A1 | * | 10/2002 | Mahajan et al. | 705/37 |
| 2004/0210536 A1 | * | 10/2004 | Gudelj | G06Q 20/10 705/64 |
| 2008/0243661 A1 | * | 10/2008 | Bussone et al. | 705/35 |
| 2009/0150262 A1 | * | 6/2009 | Mizhen | 705/27 |
| 2012/0265644 A1 | * | 10/2012 | Roa et al. | 705/26.61 |

OTHER PUBLICATIONS

Gerald L. Lohse et al. "Electronic Shopping", Communications of the ACM, Jul. 1998 / vol. 41, No. 7, pp. 81-88.*

* cited by examiner

*Primary Examiner* — Naeem Haq
(74) *Attorney, Agent, or Firm* — Wood Herron & Evans LLP (57) ABSTRACT

A system and method for selling services, experiences, and/or products over the Internet is presented. Customers may subscribe to a boutique product purchase feature that allows them to purchase limited offer products without proceeding through a check-out procedure. The method may include the steps of: (1) presenting the user with purchase options, (2) selecting a purchase option (3) presenting an order summary, (4) confirming the order, (5) charging an account, and (6) returning the user to a shopping page. Alternatively, the method may perform steps (1) though (5) without leaving the shopping page.

16 Claims, 9 Drawing Sheets

Rue la la Quick! Buy it.

CONGRATULATIONS!

Your order is confirmed. Your order, #000000000, was successfully placed on 07/23/2009 at 2:36pm. You will be receiving a confirmation email shortly.

You just bought:
*Estimated delivery by Monday, July 30, 2009*

| | Gucci 5500 Series Black Watch<br>Color: Silver<br>1 @ $133.00 each | $133.00 |

146

Tax: $6.65 / Shipping: $9.95 / Credit $0.00

ORDER TOTAL      $ 149.60 — 145

[ CLOSE AND KEEP SHOPPING ]
147

METHOD AND SYSTEM FOR SELLING PRODUCTS OVER A COMMUNICATIONS NETWORK

TECHNICAL FIELD

This application relates generally to use of the Internet as a tool for selling products to remote users.

BACKGROUND

The Internet is a publically accessible global network that carries data through packet switching using the Internet Protocol (IP). A computer connected to the Internet can send and receive data from other computers that are also connected to the Internet, thereby allowing the computers to exchange information and provide services to each other, such as electronic mail, online chat, file transfer and web browsing. Web browsing, in particular, is widely used as a way to access information and services available through the Internet. Web browsing involves using an application program—called a browser—running on a first computer to retrieve data from a second computer over the Internet. The first computer is referred to as a client, while the second computer is referred to as a server. Typically, the server supplies the data and computer commands that make up a web site to the client computer in a process commonly referred to as hosting the web site. The browser interprets the data and commands retrieved from the server, causing the browser to display the data in such a way so that the user views it as a web page. Typically, the user will interact with the browser by entering keyboard, mouse, and/or other user interface commands, which causes the browser to load web pages and/or request that the server perform operations.

One Internet service that has become popular is retail sales. Internet retail sellers create virtual stores in the form of web sites that display their merchandise, and allow users to purchase goods, experiences, and services online. These goods, experiences, and services (collectively referred to herein as "products") may be in a form that can be delivered immediately over the Internet, such as digital media or software, or they may be in a form that requires shipment using conventional methods of delivery. Typically, a user visiting a retail sales web site will browse a collection of products displayed on a series of web pages, putting products which they are interested in into a virtual shopping cart, i.e., a personalized list of products marked for later purchase. When the user is finished shopping at the site, the user will proceed to a virtual checkout, where the user can purchase the products in their virtual shopping cart. In order to complete a purchase, a user will end the shopping experience by proceeding to a checkout web page, which is often served by a secure server that is separate from the server that provides product description pages.

Because of the convenience and cost savings associated with the Internet shopping experience, retail sales over the Internet have seen tremendous growth. In response to this demand, a large number of retail sales sites have emerged, and competition to provide a unique and compelling sales experience has created improved systems, methods and computer program products to serve this industry, and yet, a need for further improvements remains.

SUMMARY

In accordance with principles of the present invention, when a customer in a shopping web site is given the option of purchasing products immediately through a shortcut of the shopping cart process, that nevertheless is consistent and compatible with the familiar shopping cart model. Advantageously, this method can permit a purchase to occur without the customer leaving the shopping page presented by the shopper's browser. In a particular embodiment of the invention, the customer purchasing a product is asked to confirm the purchase, and potentially one or more other products in the customer's virtual shopping cart, via a popup window in the shopping page, so that the customer can be immediately returned to the main display of the shopping page.

One application of the invention is to limited availability products. In order to foster a sense of excitement and entice web shoppers to purchase more goods and services, it may be advantageous to present limited availability offers to online shoppers. One example of a limited availability offer is a so-called boutique product, which is limited in either the amount of time the product is available, and/or in the amount of product made available. Boutique products encourage consumers to make purchases by engendering a sense of scarcity. However, if a conventional shopping cart model is used, when a consumer decides to take advantage of a limited offer by adding the boutique product to their shopping cart, time might expire or the product may sell out before the consumer finishes shopping. This creates a time pressure on the consumer to end or defer their shopping experience in order to proceed to the virtual checkout and complete the transaction. Once the consumer has left the shopping page to complete a purchase, there is a possibility they will not return and continue shopping. Thus, the same time pressure created by boutique products that encourages the consumer to buy the boutique product may also lead to lost sales of other products, by encouraging the consumer to terminate his/her shopping prematurely.

In accordance with principles of the present invention, it has been recognized that there is an advantage to allowing consumers to make immediate purchases of some products, such as to relieve time pressure of boutique products, without disrupting the general shopping experience, and that this can be accomplished by the shortcut shopping cart process elaborated here.

BRIEF DESCRIPTION OF THE SEVERAL VIEWS OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
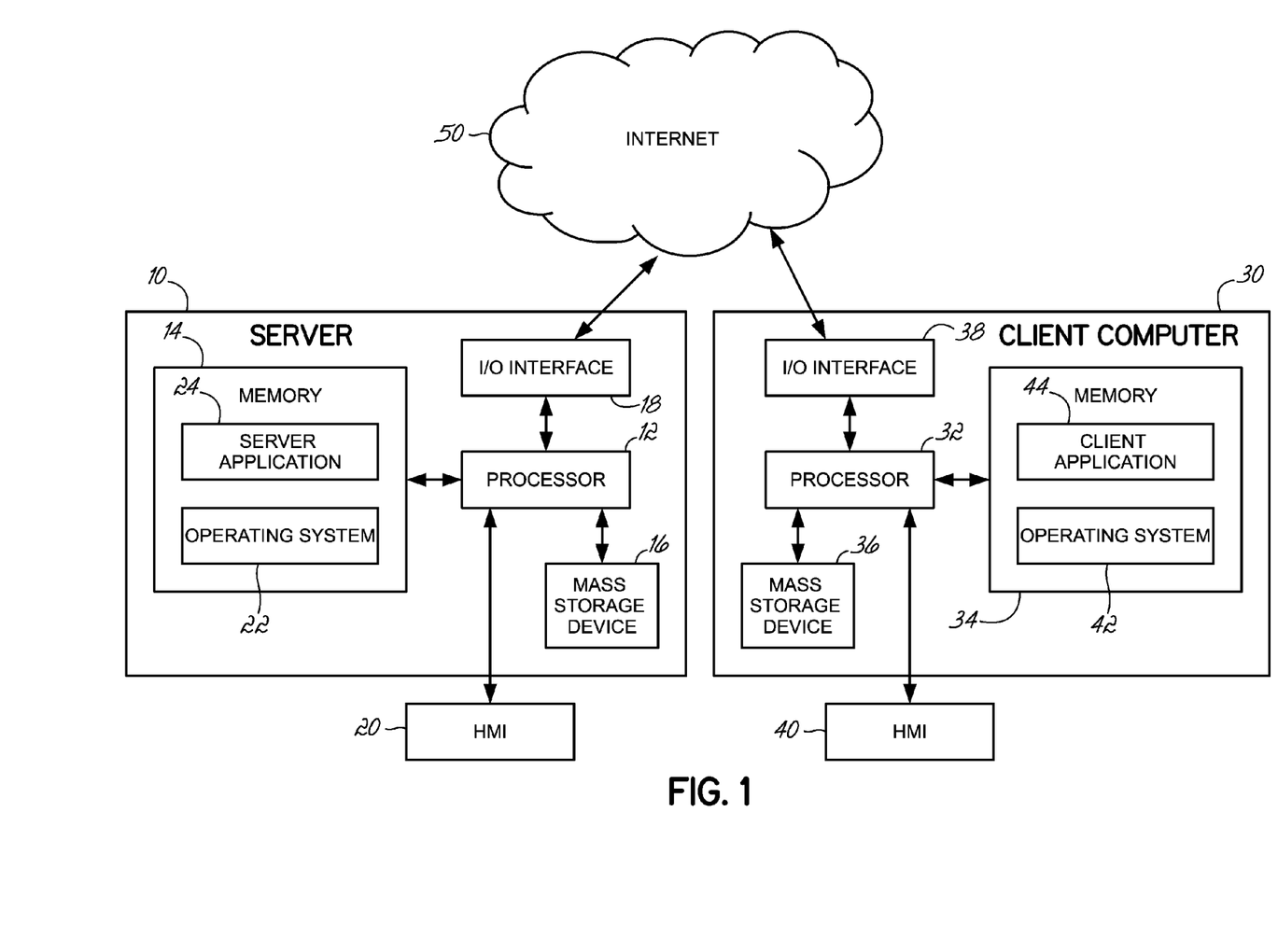
FIG. 1 is a block diagram illustrating a system in accordance with an embodiment of the invention.

Turning to the drawings, wherein like numbers denote like parts throughout the several views, FIG. 1 is a block diagram illustrating a system architecture in accordance with an embodiment of the invention. A server computer 10 hosts a web site and is connected to the Internet 50 in such a way that it can exchange data with a client computer 30 using standard Internet protocols. Although the server 10 and client 30 computers will both typically be computers, and will be referred to as such throughout the application, they may represent practically any computing device, computer system, or programmable device capable of communicating over a network, including but not limited to multi-user or single-user computers, desktop computers, portable computers and devices, handheld devices, network devices, mobile phones, tablet and touch pad devices, and the like. In addition, although the server computer 10 and client computer 30 are shown as communicating over the Internet 50, embodiments of the invention may include communication by any other means, such as over Wide Area Networks (WAN), Local Area Networks, (LAN), private networks, Virtual Private Networks (VPN), phone systems, wireless communications systems, satellite communications systems, or any other mechanism by which data may be exchanged.

Server and client computers 10, 30 may each include one or more processors 12, 32 coupled to a memory 14, 34. The computer processor 12, 32 may represent one or more devices selected from microprocessors, micro-controllers, digital signal processors, microcomputers, central processing units, field programmable gate arrays, programmable logic devices, state machines, logic circuits, analog circuits, digital circuits, and/or any other devices that manipulate signals based on operational instructions that are stored in a memory 14, 34. Each computer 10, 30 may have a memory 14, 34 that typically represents devices comprising the main storage of each computer 10, 30. Each respective memory 14, 34 may be comprised of a single memory device or a plurality of memory devices including but not limited to random access memory (RAM), static random access memory (SRAM), dynamic random access memory (DRAM), read-only memory (ROM), volatile memory, non-volatile memory, flash memory, cache memory, and/or any other device capable of storing information. In addition, each memory 14, 34 may be considered to include memory storage physically located in multiple locations, such as any cache memory in processors 12, 32, memory on video or other peripherals such as accessory cards (not shown) and/or storage capacity used as a virtual memory, such as storage capacity on mass storage devices 16, 36.

Each computer 10, 30 may also include a mass storage device 16, 36, each of which may represent a single mass storage device or a plurality and/or array of mass storage devices including but not limited to hard drives, optical drives, tape drives, non-volatile solid state devices and/or any other device capable of storing information. Each computer 10, 30 may also include an Input/Output (I/O) interface 18, 38, with each I/O interface employing suitable communication protocols for communicating with other computers and computing devices. In one embodiment of the invention, the I/O interfaces 18, 38 may operate by transmitting Internet Protocol (IP) packets over an Ethernet connection. In another embodiment of the invention, the I/O interfaces 13, 38 may operate by transmitting signals over a wireless link to an access point. A Human Machine Interface (HMI) 20, 40 may be operatively coupled to each processor 12, 32 in a known manner. Each HMI 20, 40 may comprise one or more user input devices such as an alphanumeric keyboard, touchpad, touch screen, keypad, stylus, mouse, trackball, joystick, pointing device, and/or microphone, capable of accepting commands or inputs from the operator and transmitting the entered input to its respective processor 12, 32. Commands may be in the form of selecting menu options, pressing buttons, entering text, speech recognition by the computer, or any other mechanism capable of communicating the intent of the user to the computer. Each HMI 20, 40 may also include one or more display devices including, but not limited to, a CRT monitor, LCD display panel, alphanumeric display, touch screen, and/or speaker.

Each computer 10, 30 may operate under the control of one or more operating systems 22, 42 that resides in memory 14, 34 and executes or otherwise relies upon various computer software applications, components, programs, objects, modules, and data structures. A server application 24 may be implemented as part of the operating system 22 or as a separate application on computer 10. In one embodiment of the invention, the server application 24 may be a web server program that delivers web page content over the Internet 50. In another embodiment of the invention, the web page content may be related to retail sales over the Internet. The web page content may be stored on a mass storage device 16, in memory 14, or on another storage device or computer in another location. In a similar fashion, a client application 44 may be implemented as part of the operating system 42, or as a separate application to facilitate access to the server application 24 by a user. In one embodiment of the invention, the client application 44 may be a web browser program.

Figure 2:
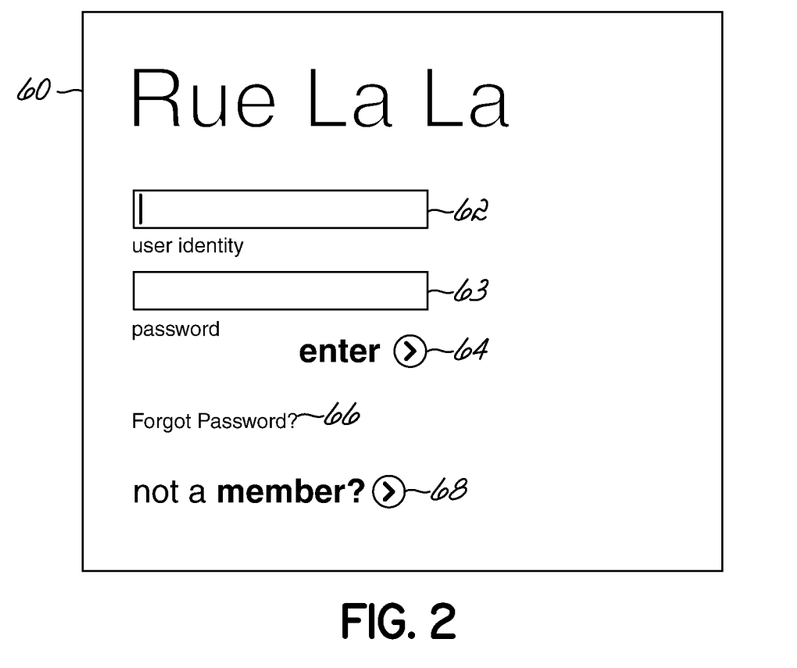
FIG. 2 is a diagram of a log in web page presented to a client computer user attempting to access a web page hosted by the server computer in FIG. 1.

FIG. 2 is a diagram depicting how a user may obtain access to the web site in one embodiment of the invention. A user may enter the address of the web site hosted by the server computer 10 into the client application 44 using the HMI 40. The client computer 30 may be connected to the server computer 10 in such a way that the client application 44 may exchange data with the server application 24. Typically, the data is displayed to the user in the form of a web page on the HMI 40 that includes images and text. The user may interact with the web page by entering commands though the HMI 40, which may cause the server application 24 to perform various operations. The web page initially presented to the user may be a log-in page 60 or some other welcome page from which the user can navigate to other pages and access additional web pages included on the web site. If the user has a customer account with the web site, they may be prompted to log into their account by entering a user identity 62 and password 63. The user identity 62 will typically be the user's email address, but may be any alphanumeric string unique to that user.

After the user enters the user identity 62 and password 63, the user may enter the site 64. Users who have forgotten their user identity 62 or password 63 may be provided with a mechanism to re-set his/her password in order to gain access to his/her customer account 66. One way of providing such access is to send a special link to the registered e-mail address of the requesting user. Clicking on the link allows the user to reset the password so that the user may gain access to his/her account. Users who do not have a customer account, or that do not wish to log in before entering the site, may select a non-member option 68. Users selecting the non-member option may be prompted to create a customer account, or they may be allowed access to the web site anonymously.

Once the user has entered the web site, they may navigate to other web pages by selecting objects on the displayed web page, or though keystrokes, mouse clicks, voice commands, or by entering any other suitable user inputs available on the HMI 40.

Figure 3:
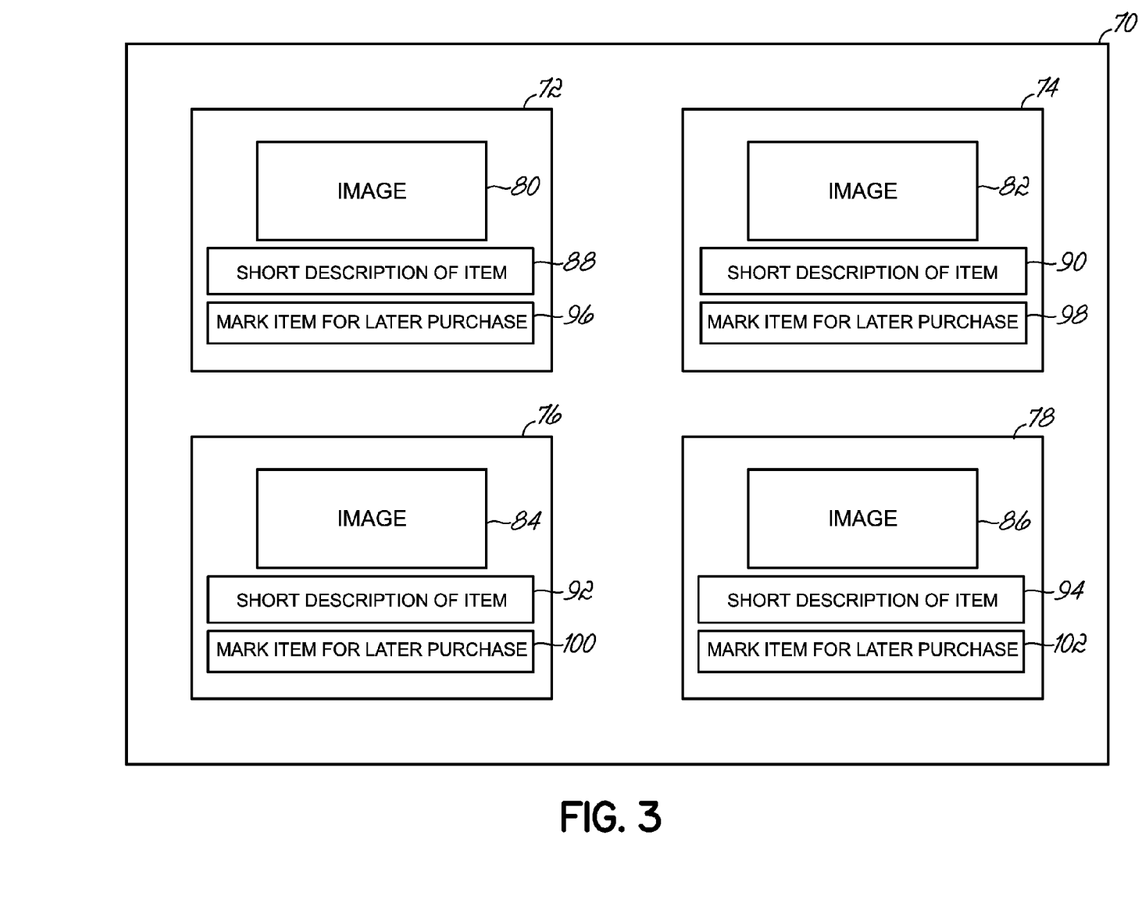
FIG. 3 is a diagram of an exemplary shopping page that may be hosted by the server computer in FIG. 1.

FIG. 3 illustrates an example of a web shopping page in accordance with an embodiment of the invention. Users may be presented with a web shopping page 70 including product presentations 72, 74, 76, 78 for products available for purchase. There are many variations on how product presentations 72, 74, 76, 78 may be configured, but typically one or more product presentations 72, 74, 76, 78 may be displayed on a single shopping page, with each product presentation 72, 74, 76, 78 including images 80, 82, 84, 86, a short description 88, 90, 92, 94 and buttons providing options to the user. If the user is interested in a particular product, they may be given the option of obtaining more detailed information, and may also be given the option of marking the product for later purchase 96, 98, 100, 102, which may place the product in a virtual shopping cart. In one embodiment of the invention, the user may obtain more detailed information on a product by selecting the product image 80, 82, 48, 86 or short description 88, 90, 92, 94. In another embodiment of the invention, the user may mark a product for later purchase without viewing detailed information via options 96, 98, 100, 102. Marking for later purchase may include putting the product in a virtual container, such as a virtual shopping bag or virtual shopping cart, as is conventional. The product presentation 72, 74, 76, 78 may also include an option (not shown) allowing the user to purchase the product by a shopping cart shortcut process as explained in detail herein. Users browsing the web site may select and view web pages 70 presenting only standard product presentations, or only boutique product presentations, or a boutique product presentation may periodically be displayed in a space that may be co-located on a shopping page with standard product presentations.

Figure 4:
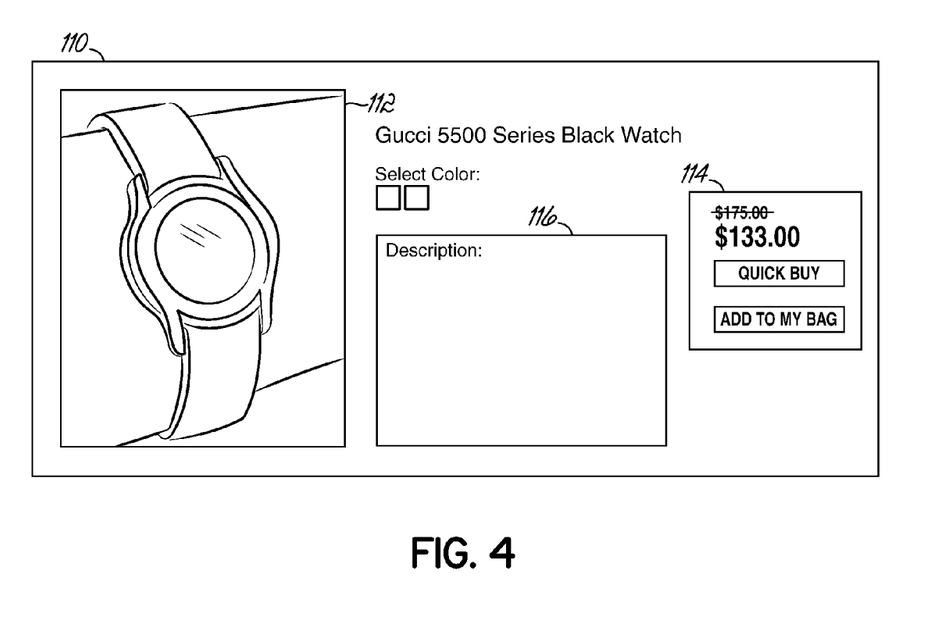
FIG. 4 is a diagram of an exemplary shopping page that may be accessed by selecting a product from the shopping page in FIG. 3.
Figure 5:
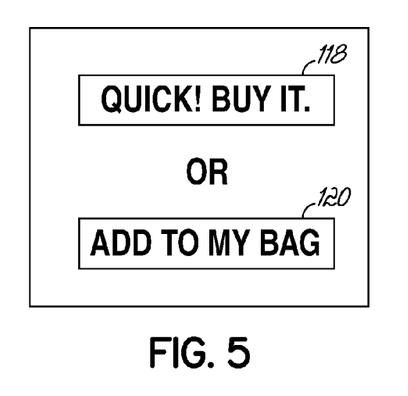
FIGS. 5 and 6 are diagrams detailing the user options presented in FIG. 4.
Figure 6:
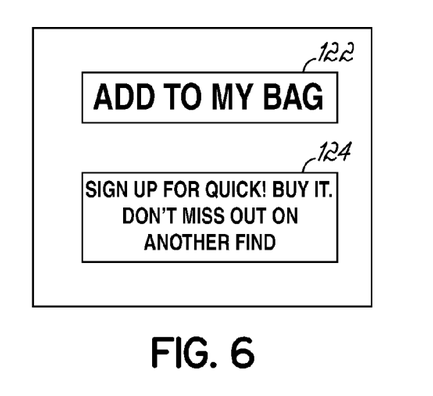

FIGS. 4-8 are diagrams illustrating how the user may be presented with and purchase a product in several embodiments of the invention. Referring now to FIG. 4, Product presentations 110 will typically include an image of the product 112, a short description 116, and an option box 114. Users who subscribe to a shortcut product purchase feature (subscribers) may be presented with an option box 114, which may present the options of either purchasing the product 118 (shown in FIG. 5 as a "Quick! Buy It." option), or marking the product for later purchase 120 (shown in FIG. 5 as an "Add it to My Bag" option). Users who are not subscribed to the shortcut product purchase feature (non-subscribers) may be given the options of marking it for later purchase 122 or subscribing to the shortcut product purchase feature 124 as shown in FIG. 6.

Figure 7:
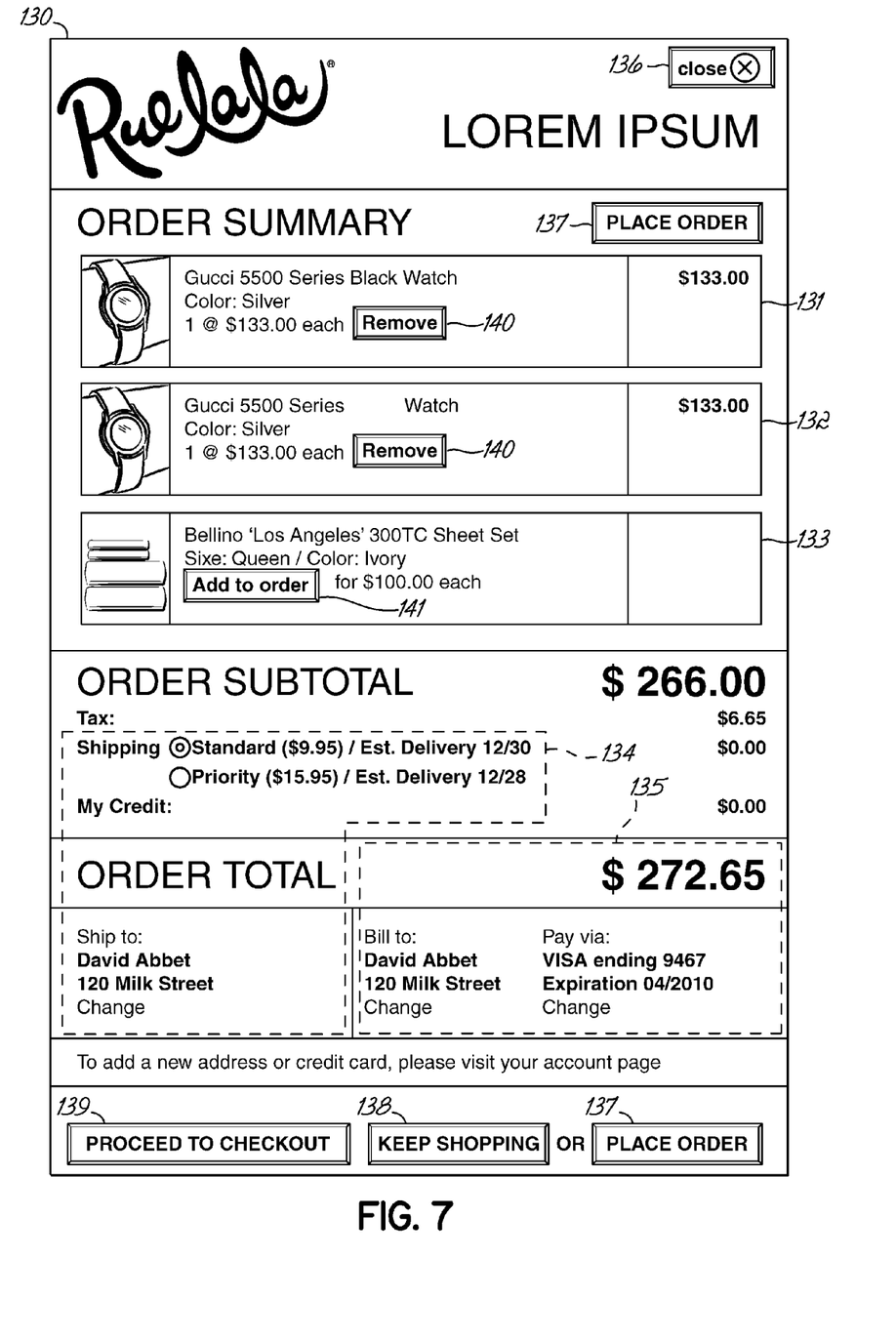
FIG. 7 is a diagram of an exemplary pop-up order summary generated by selecting the "Quick! Buy It." purchase options presented in FIGS. 4-5.

Referring now to FIG. 7, subscribers who select the shortcut product purchase option 118 may be presented with a pop-up window containing an order summary 130. The order summary 130 may include product information on one or more boutique or non-boutique products 131-133, shipping information 134, payment information 135, as well as providing subscribers with the options of closing the order summary 136, placing the order 137, continuing shopping 138, or proceeding to checkout 139. Product information 131, 132, 133 may include information on the most recently selected product 131, other products that may have been selected previously 132, as well as products which were recently removed 133 from the shortcut or "Quick! Buy It." order summary 130. Subscribers may have the option of removing a product from the shortcut or "Quick! Buy It." list by selecting a remove option 140, and may also have the option of adding recently removed products 133 to the shortcut or "Quick! Buy It." list by selecting an "add to order" option 141. When the subscriber either adds or removes a product 131-133 from the order summary 130, the shipping information 134 and payment information 135 may be automatically updated. Products that have been removed 133 may be marked for later purchase so that they are displayed and accessible in the subscriber's virtual shopping cart when used in normal checkout processes. The subscriber may also be presented with the option to proceed to the normal checkout 139. Subscribers selecting the proceed to checkout option 139 may be presented with a check out order summary that includes all items that are marked for later purchase, as well as all currently selected products 131-133.

Figure 8:
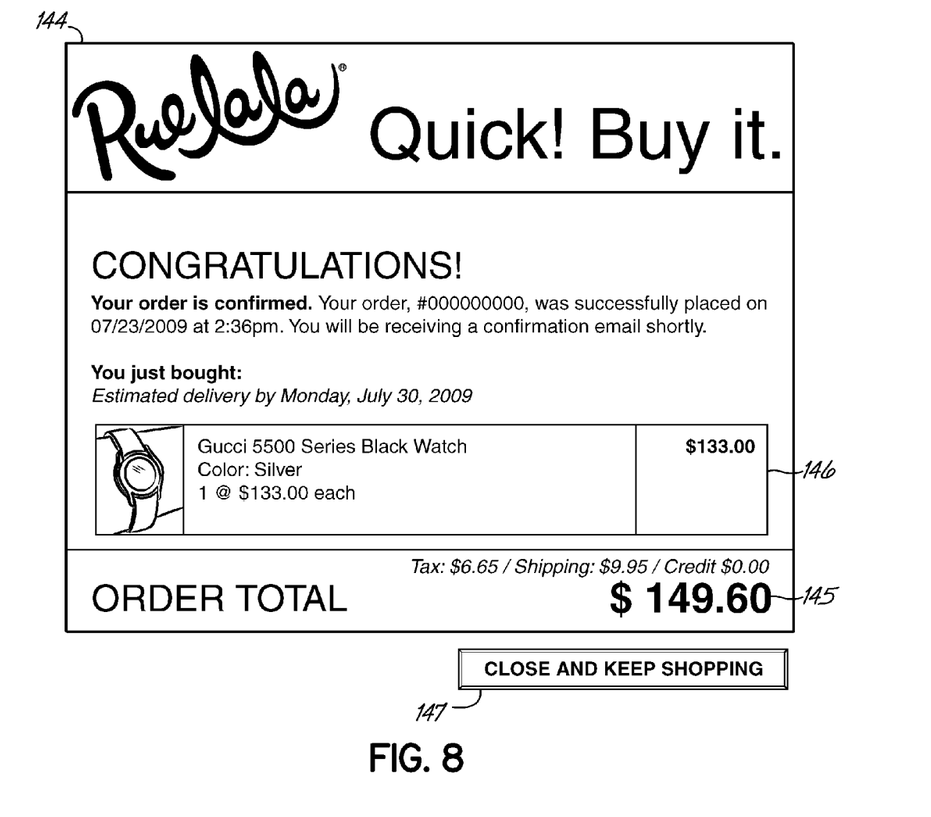
FIG. 8 is a diagram of an exemplary pop-up order confirmation generated by selecting the place order option in FIG. 7.

Subscribers select the place order option 137 to quickly purchase the currently selected products. The subscriber may then be presented with an order confirmation pop-up window 144 as shown in FIG. 8. In the example of FIG. 8, only the black men's watch shown in FIG. 7 has been retained for purchase by the shortcut or "Quick! Buy It." process. The order confirmation window 144 may include information concerning the amount billed 145 and the product purchased 146. Subscribers may then be given the option of closing the window 147, which may return them to the main display of the shopping page 70 (FIG. 3). Both subscribers and non-subscribers who select the option of marking the product for later purchase 120, 122 may have the selected product marked for later purchase so that it may be purchased through a conventional shopping cart process when the user is finished shopping. Notably, as a result, the shortcut or "Quick! Buy It." process has the feature that the user does not need to purchase all the items in their virtual cart when making a quick purchase; other items in the cart, if not included in the shortcut or "Quick! Buy It." purchase, are left in the cart and may be purchased later. It is, however, possible to quick buy multiple items in the cart, or even all items in the cart, and in this way the quick buy is not a bypass of the shopping cart, but rather is a shortcut of the normal shopping cart process.

It is worth nothing that, as in other conventional shopping processes that involve a shopping cart, if a product offer expires on an item left in the cart and not purchased, or the inventory runs out prior to the user purchasing the product left in the cart, the product may be deleted from the cart and be unavailable later during a conventional checkout process.

Figure 9:
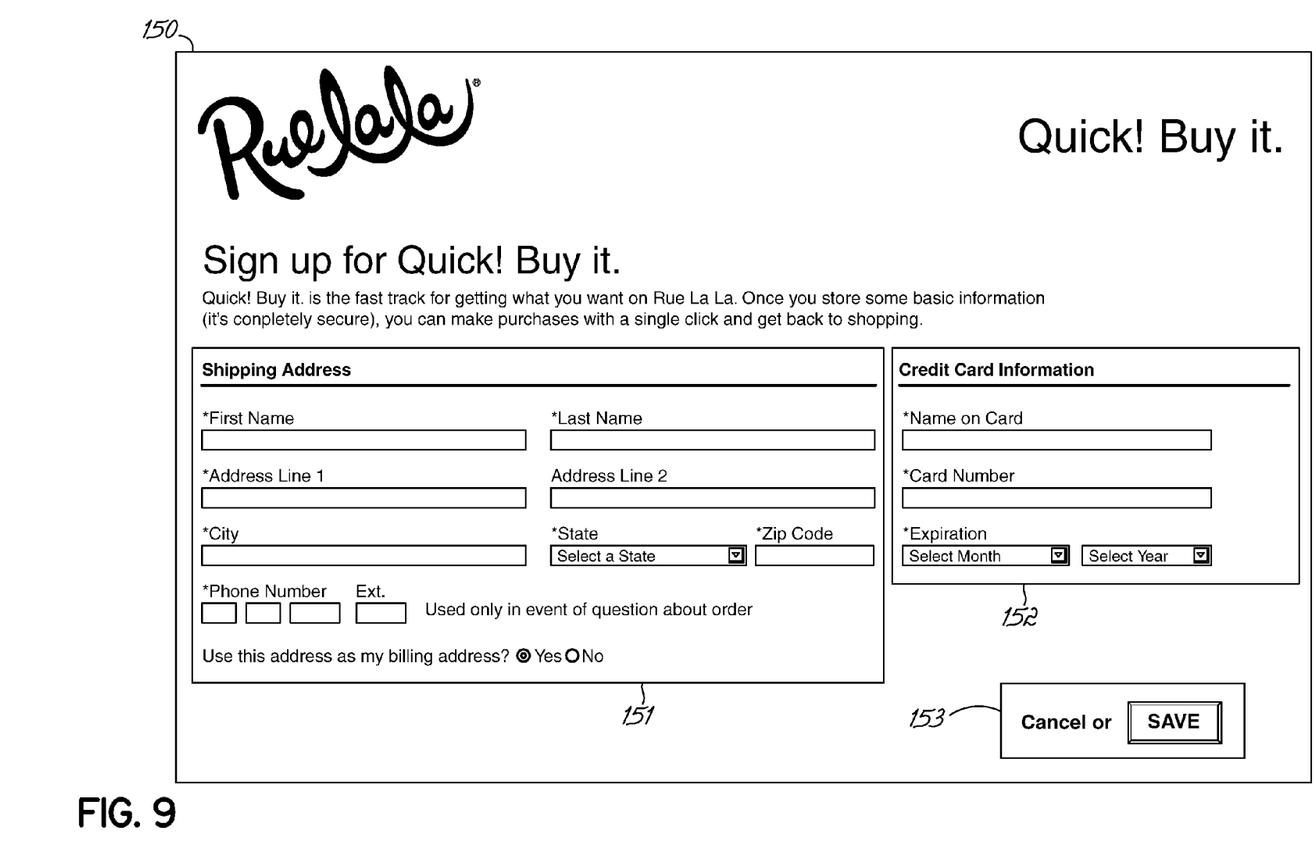
FIG. 9 is a diagram of an exemplary product purchase feature sign up page which may be generated when a non-subscriber selects the sign-up option presented in FIG. 6.

Referring now to FIG. 9, non-subscribers who select the option of signing up for the shortcut product purchase feature 124 (FIG. 6) may be presented with a feature sign up window 150. The feature sign up window 150 may include spaces for the user to insert billing and shipping address information 151, payment methods 152, and giving the user the option of either submitting the data entered or cancelling the session 153. When the user has entered the required information in the address space 151 and payment method space 152, and selects the submit option 153, their customer account status may change to that of a subscriber. When this occurs, the user may also receive confirmation that they are now a subscriber.

Figure 10:
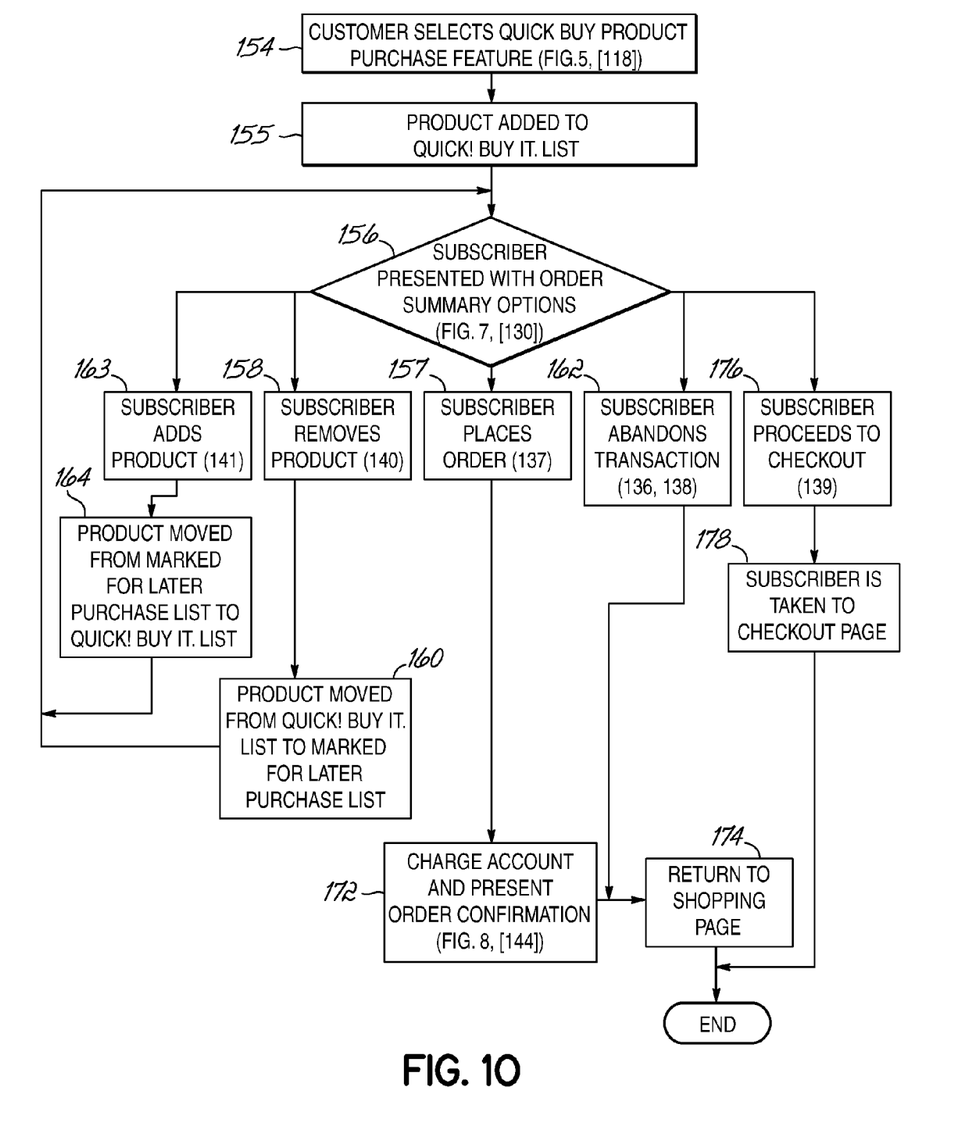
FIG. 10 is a flow chart of a subscriber "Quick! Buy It." purchase process as illustrated by FIGS. 5, and 7-8.

FIG. 10 presents a flowchart illustrating a process as previously described and in accordance with an embodiment of the invention for a user who is a subscriber. A subscriber may select a product 154, which may cause a product to be added to the "Quick! Buy it." list 155. The subscriber may be presented 156 with order summary options that include making a purchase 157; removing the product 158, or canceling the transaction 162. Removing the product 158 causes the product to be marked for later purchase (i.e., held in the user's conventional shopping cart) 160. Canceling the transaction 162 returns the subscriber to the main display of the shopping page 174.

If there are products which are in the user's conventional shopping cart (i.e., marked for later purchase), the subscriber may be given the option of adding 163 those products to the shortcut or "Quick! Buy It." product list, which may cause those products to be moved 164 from the marked for later purchase list to the "Quick! Buy it." list. This permits free selection of which products are to be purchased in the shortcut or "Quick! Buy It." process and which are to be purchased later via a conventional shopping cart process. If the subscriber places the order 157, the subscriber's account may be billed for the cost of the products on the "Quick! Buy it." list and the user may be presented with an order confirmation 172, at which time the subscriber may be returned to the main display of the shopping page 174.

The subscriber may also select to proceed to a conventional shopping cart checkout 176, they may be taken to a checkout page 178, where they may be presented with the opportunity to buy all products on the "Quick! Buy it." and marked for later purchase lists.

Notably, the functionality of the "Quick! Buy It." process described in reference to FIG. 10 may be implemented in the user's browser as a popup window, allowing faster access to purchasing screens and switching between screens without the invocation of a separate server for checkout purposes and without the reloading of different pages, as is conventionally done for a conventional checkout process. This makes the shortcut or "Quick! Buy It." process as speedy as single-button purchase processes that bypass the shopping cart, as have been implemented by some web sites, and yet, the quick buy process is more flexible. The speed derives from the use of a popup window rather than a new page to display and purchase items, and the flexibility comes from the inclusion of the shopping cart in the process, which gives the user the ability to purchase items already in the shopping cart and/or to move items interactively between the existing shopping cart and the shortcut or "Quick! Buy it." purchase list.

Figure 11:
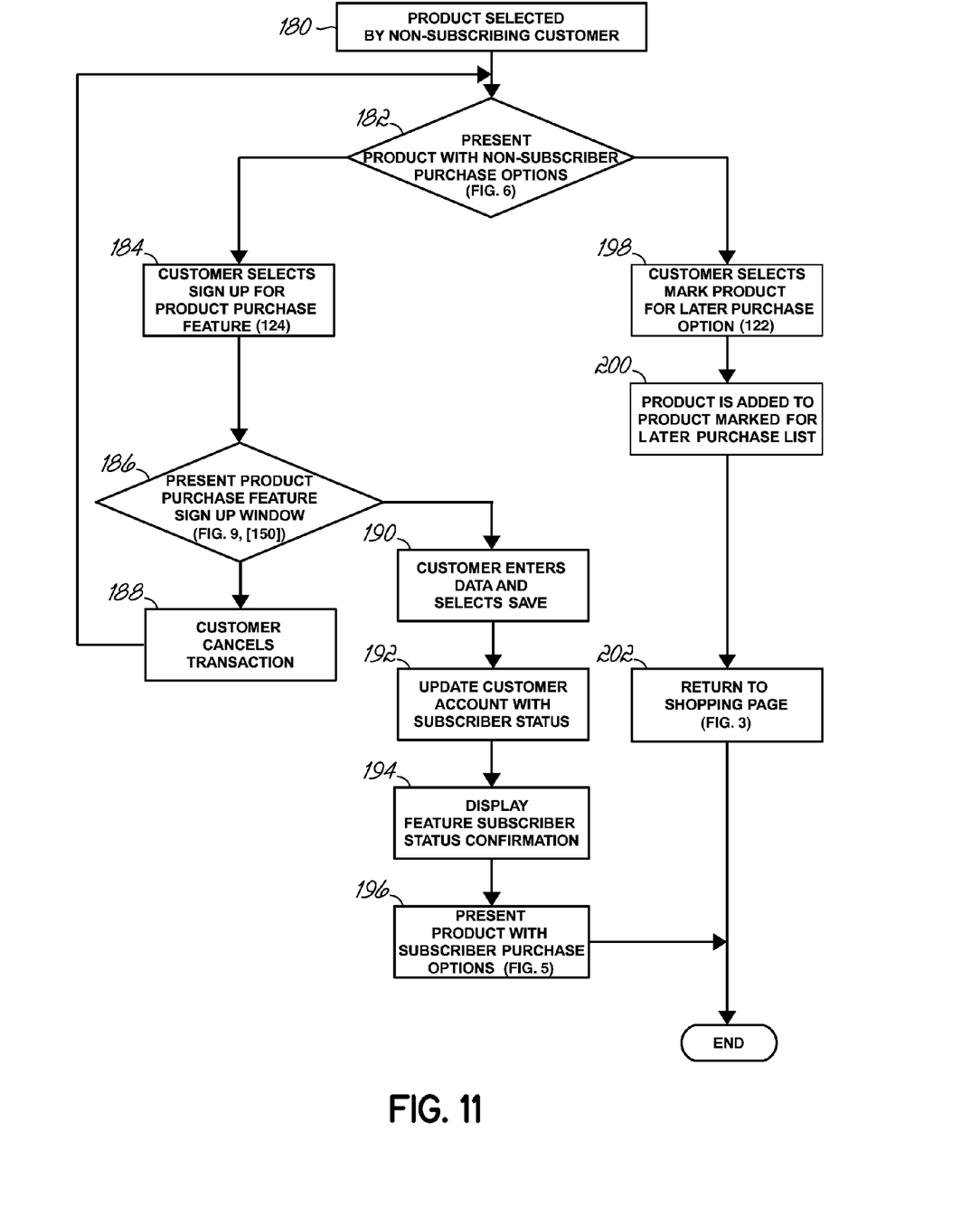
FIG. 11 is a flow chart of a non-subscriber purchase and feature sign-up process as illustrated by FIGS. 6 and 9.

FIG. 11 presents a flowchart illustrating a process as previously described and in accordance with an embodiment of the invention for a user who is a non-subscriber. A non-subscriber may select a product 180, which may cause the product to be presented to the non-subscriber 182 in such a way that it includes options such as signing up for the product purchase feature 184, or marking the product for later purchase 198. If the non-subscriber selects the sign up for the product purchase feature option 184, a purchase feature sign up window may be presented 186 including the options of cancelling the transaction 188 or entering product purchase feature sign-up data 190. If the non-subscriber cancels the transaction 188, they may be returned to the product presentation 182. If the non-subscriber enters the necessary data and selects save 190, the customer account may be updated to reflect the user's status as a purchase feature subscriber 192. A product purchase feature subscriber status confirmation may then be presented to the now subscribing user 194, and the user may then be taken to the product presentation as a subscriber 196. Step 196 may cause the product to be added to the "Quick! Buy it." list 155, and presented to the subscriber in such a way that it includes the subscriber options previously described in step 156. Thereafter, the purchase process may be substantially the same as presented in FIG. 10.

If a non-subscriber selects the mark product for later purchase option 198, the product may be placed on a list of products that the subscriber has indicated he/she wishes to purchase 200, and the non-subscriber may then be returned to the main display of the shopping page 202. The non-subscriber may be given the option of purchasing the products on the marked for later purchase list at a later time when the non-subscriber is ready to end their shopping session.

As will be appreciated by one skilled in the art, the embodiments of the invention may also be embodied in a computer program product embodied in at least one computer readable storage medium having computer readable program code embodied thereon. The computer readable storage medium may be an electronic, magnetic, optical, electromagnetic, infrared, or semiconductor system, apparatus, or device, or any suitable combination thereof, that can contain, or store a program for use by or in connection with an instruction execution system, apparatus, or device. Exemplary computer readable storage media include, but are not limited to, a hard disk, a floppy disk, a random access memory, a read-only memory, an erasable programmable read-only memory, a flash memory, a portable compact disc read-only memory, an optical storage device, a magnetic storage device, or any suitable combination thereof. Computer program code for carrying out operations for the embodiments of the present invention may be written in one or more object oriented and procedural programming languages.

The methods described herein can be implemented by computer program instructions supplied to the processor of any type of computer to produce a machine with a processor that executes the instructions to implement the functions/acts specified herein. These computer program instructions may also be stored in a computer readable medium that can direct a computer to function in a particular manner. To that end, the computer program instructions may be loaded onto a computer to cause the performance of a series of operational steps and thereby produce a computer implemented process such that the executed instructions provide processes for implementing the functions/acts specified herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "composed of" or variants thereof are used in either the detailed description or the claims, such terms are intended to be inclusive in a manner similar to the term "comprising."

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A method of selling a product via the interaction of a client and a server computer comprising:
   associating a user of a client computer with a customer account stored in a server computer and with one or more products identified in storage of the server computer selected for purchase but not yet authorized for purchase or purchased;
   displaying a shopping page at the client computer, wherein the shopping page contains information identifying a product;
   in response to the user selecting an option to enable a shortcut purchase feature, displaying a sign up form, wherein the sign up form prompts the user to enter information including a payment method and a shipping address, and in response to a user confirmation, enabling the shortcut purchase feature;
   presenting the user via a display at the client computer with an option of shortcut purchase of the product identified on the shopping page, wherein in response to a request to shortcut purchase the product, the user is presented with a popup window on the shopping page presented by the display of the client computer identifying the product, and the one or more products previously selected for purchase but not yet authorized for purchase or purchased, along with a purchase summary and an option to authorize a purchase; and
   in response to the user confirming the shortcut purchase via the client computer, returning the user to the shopping page from the popup window.

2. The method of claim 1, wherein the product is a boutique product presented to the user in conjunction with a statement of limited availability.

3. The method of claim 2, further comprising
   enabling the customer account with a shortcut product purchase feature prior to presenting the option of shortcut purchase.

4. The method of claim 3, wherein if the customer account is not enabled with the shortcut product purchase feature, presenting the user an option to select the product for purchase without immediately purchasing the product.

5. The method of claim 1, further comprising presenting the user an option to authorize the purchase of one or more of the products previously selected for purchase but not yet authorized for purchase or purchased.

6. The method of claim 1, further comprising presenting the user an option to remove the product, wherein in response to the user selecting the option to remove the product, the product is marked as a product previously selected for purchase but not yet purchased.

7. The method of claim 1, further comprising presenting the user with an option to return to the shopping page without authorizing the purchase.

8. A method of selling a product via the interaction of a client and a server computer comprising:
   associating a user of a client computer with a customer account stored in a server computer and products identified in storage of the server computer previously selected for purchase but not yet authorized for purchase;
   displaying a shopping page at the client computer, wherein the shopping page contains information identifying a product;
   in response to the user selecting an option to enable a shortcut purchase feature, displaying a sign up form, wherein the sign up form prompts the user to enter information including a payment method and a shipping address, and in response to a user confirmation, enabling the shortcut purchase feature;
   in response to the user selecting the product via the client computer, presenting the user with a product page via a display of the client computer, wherein the product page includes information about the selected product and presents the user with the option of including the selected product in a virtual shopping cart along with any products previously selected for purchase, and the option of purchasing the selected product through the shortcut shopping cart process;
   in response to the user selecting the shortcut shopping cart process option via the client computer, presenting the user via a display of the client computer with a popup window of the product page, the popup window identifying the selected product and products previously selected for purchase, and a purchase summary and asking the user to confirm the purchase of the selected product without authorizing the purchase of at least one product previously selected for purchase; and
   in response to the user confirming the purchase of the selected product without authorizing the purchase of at least one product previously selected for purchase, implementing the purchase of the selected product and returning the user to the shopping page.

9. A system for selling a product comprising:
   a server computer configured to host a web site, the server computer being communicatively coupled to a network and connectable to a client computer configured with a web browser;
   wherein the web site is configured to direct the web browser to prompt a user for identifying information for a customer account, and displaying a shopping page;
   wherein the shopping page includes information identifying a product and an option of selecting a product for purchase;
   wherein the server, in response to the user selecting an option to enable a shortcut purchase feature, displays a sign up form, wherein the sign up form prompts the user to enter information including a payment method and a shipping address, and in response to a user confirmation, the server enables the shortcut purchase feature;
   wherein after enabling the shortcut purchase feature, in response to a request to purchase the product from the browser, the server directs the browser to generate a popup window depicting the product, and products previously selected for purchase but not yet authorized for purchase or purchased, along with a purchase summary and an option to confirm the purchase of the selected product and not at least one product previously selected for purchase; and in response to the user confirming the purchase, the server arranges the purchase of the selected product returning the user to the shopping page.

10. The system of claim 9, wherein the selected product is a boutique product presented to the user in conjunction with a statement of limited availability.

11. The system of claim 10, wherein the server verifies that the customer account is enabled with a shortcut product purchase feature prior to directing the browser to present with the option of purchasing the product.

12. The system of claim 11, wherein if the customer account is not enabled with the shortcut product purchase feature, the user is provided with an option to select the product for purchase without purchasing the product.

13. The system of claim 9, wherein the server directs the browser to present the user an option of confirming the purchase of one or more of the products previously selected for purchase but not yet purchased.

14. The system of claim 9, wherein the server directs the browser to present the user with an option of removing the selected product, wherein in response to the user selecting the option of removing the selected product, the server marks the selected product as a product previously selected for purchase but not yet purchased.

15. The system of claim 9, wherein the network comprises the Internet.

16. The system of claim 9, wherein the client computer comprises a mobile device.

* * * * *